April 29, 1958

H. WEAVER, JR 2,832,107

CORE BLOWING MACHINE

Filed March 14, 1955

INVENTOR
HARRISON WEAVER JR.

BY

ATTORNEY

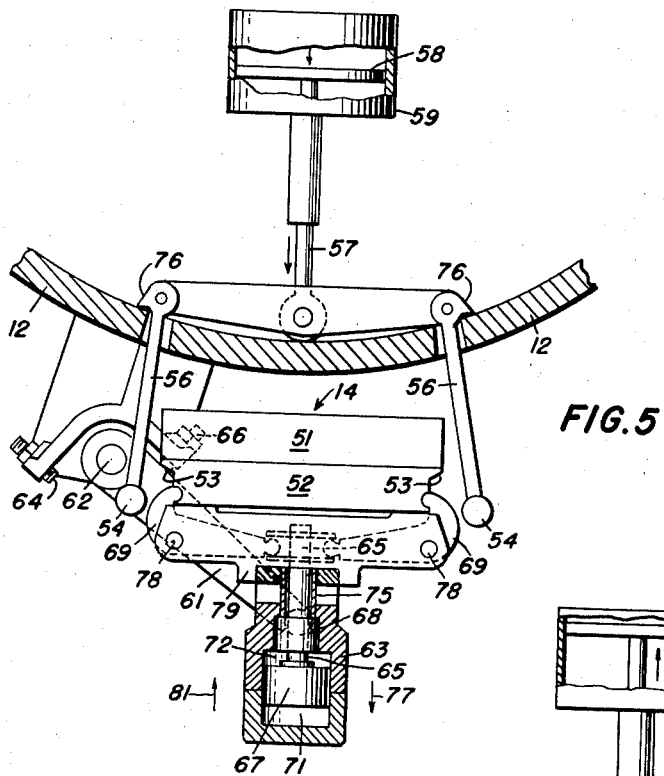
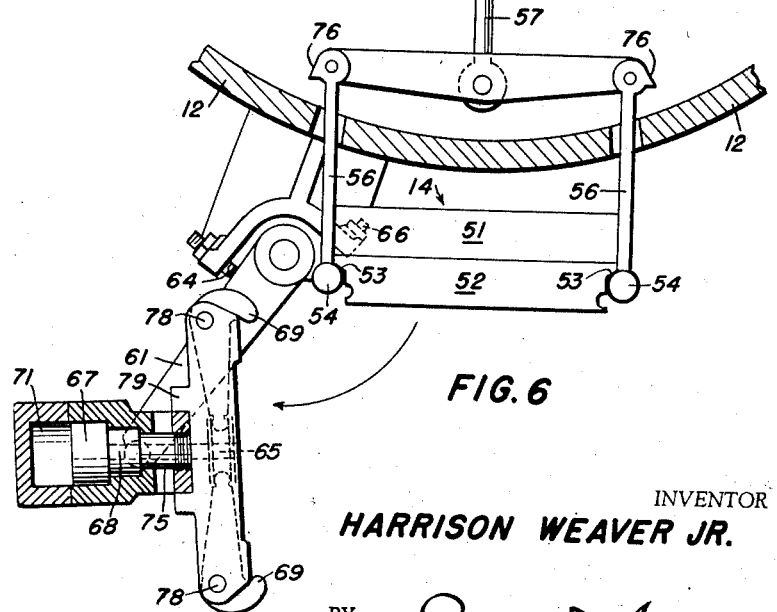

United States Patent Office 2,832,107
Patented Apr. 29, 1958

2,832,107
CORE BLOWING MACHINE

Harrison Weaver, Jr., Brillion, Wis., assignor to Brillion Iron Works, Inc., Brillion, Wis., a corporation of Wisconsin Application March 14, 1955, Serial No. 494,193

8 Claims. (Cl. 22—10)

The present invention relates to apparatus for molding sand mixed with a heat hardenable resin binder to form portions of a mold or to provide cores for use in foundry processes. The invention more particularly pertains to a machine for filling a heated mold box with a mixture of sand and a thermo-setting resin or the like wherein the resin is partially cured after which the excess mixture is removed from the mold box to provide a shell which is further heated to cure the resin.

It is an object of the present invention to provide improved apparatus for supplying a mixture of sand and heat hardenable resin into a core box or the like and to provide means for holding the core box in a fixed position while it is filled with the sand mixture including means for withdrawing the filling mechanism from the presence of the filled box and to provide means for vibrating the box so as to remove the excess granular material therefrom leaving only a thin shell of the mixture of sand and the thermosetting resin within the box to form a hollow core or shell portion of a mold.

A more specific object of the invention is to move a mixture of sand and resin upwardly into the heated mold box so as to facilitate the removal of excess material after a thin layer is formed along the perimeter of the cavity or cavities within the heated box.

A still further object of the invention is to provide means for vibrating a mold box in which the sand and resin mixture is supplied so as to remove the excess material after the resin at the outer perimeter of the cavity has been partly cured.

Another object of the invention is to provide novel means for holding one portion of a split type mold box in association with another portion thereof and to provide means for opening the mold box to facilitate removal of the molded elements.

Other objects and features of the invention will be appreciated and become apparent to those skilled in the art as the present disclosure proceeds and upon consideration of the following detail description and the annexed drawings wherein an embodiment of the invention is disclosed.

In the drawings:

Fig. 5 is a sectional view showing one position of the mechanism for opening one of the boxes.

Figs. 6 and 7 are similar sectional views illustrating other positions of the parts of the box opening mechanism.

Figure 1:
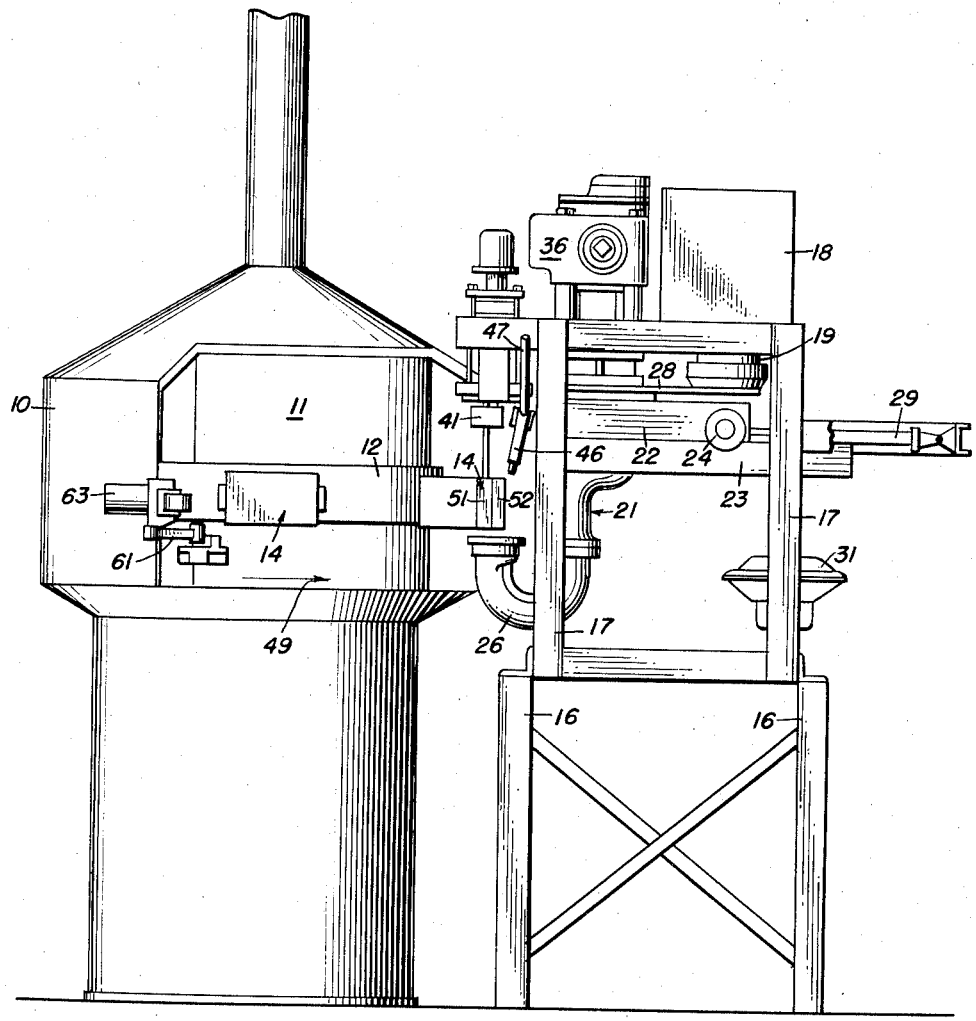
Fig. 1 is a site elevational view illustrating the general organization of apparatus exhibiting the invention.

In apparatus embodying the invention an oven of any suitable type such as shown at 10 in Fig. 1 is provided for curing the resin component of the granular mixture. The oven may be of circular shape and is open in the area indicated at 11. The oven may be heated in any suitable manner to a temperature for curing the resin binder of the sand during passage of the material through or around the oven. A table 12 is supported for rotation in a substantially horizontal plane. The table 12 is indexed by means (not shown) to a plurality of positions depending upon the number of boxes 14 in which cores or portions of a mold are formed. One of the rotated positions of the table provides a station in the open area 11 for removal of the finished cores or the like and the cleaning of a box 14 and the preparation thereof for another filling. Another indexed station is for the purpose of supplying a mixture of sand and resin into the core box and thereafter permitting the excess mixture to be removed. In operation the boxes 14 in moving through the oven 10 and after removal to the open area 11 and in the filling station retain a temperature of approximately five hundred degrees Fahrenheit.

Each box 14 is filled with sand and the resin mixture by means of the apparatus illustrated at the right in Fig. 1. The filling mechanism is supported on a base frame 16 provided with a plurality of uprights 17 supporting a hopper 18 for storing a mixture of sand and heat hardenable resin. A discharge conduit 19 depends below the hopper 18 and is provided with an outlet opening (not shown). A magazine shown generally at 21 mounted on a carriage 22 is adapted to roll on tracks 23 by means of flanged wheels 24. The magazine 21 includes a U-shaped horn 26. When the magazine 21 is in the position shown in phantom lines shown in Fig. 2 the plate 28 which is attached to magazine 21 is shifted to the right so that a quantity of the sand and resin in the hopper 18 is delivered through the telescoping ring 27 into the magazine 21.

Figure 2:
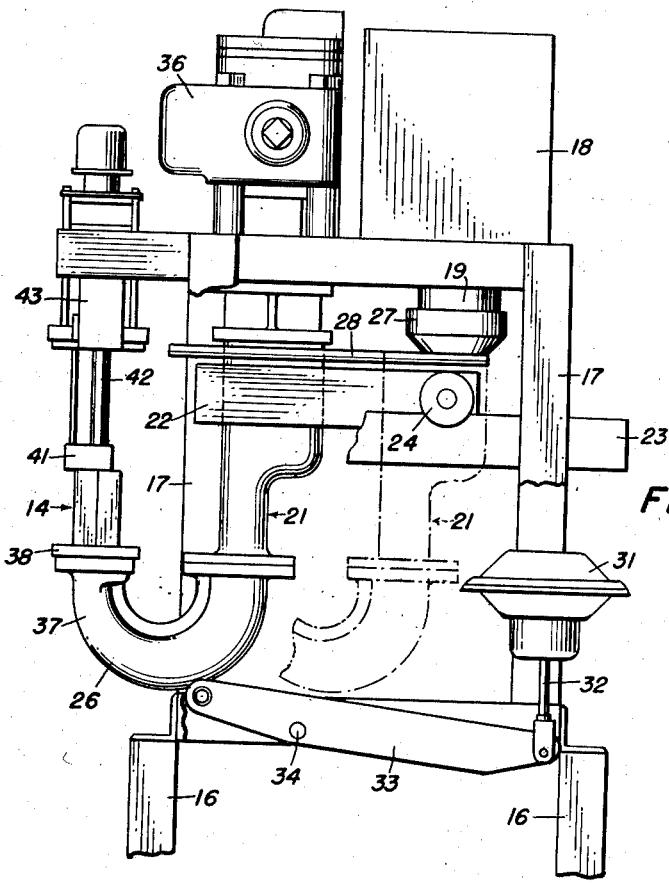
Fig. 2 is an enlarged side elevational view of the sand magazine illustrating the operative and inoperative positions thereof.

When one of the boxes 14 is in a filling position compressed air is supplied to a cylinder 29 (Fig. 1) so as to move the piston therein to the left which moves the magazine 21 to the left and to the position shown in full lines in Figs. 1 and 2. During this movement the carriage 22 rolls on the rails 23 and the free end of the U-shaped horn 26 is positioned under the box 14. The plate 28 is also moved to the left and the solid portion of the plate 28 moves under the telescoping ring 27 to close the lower end of the conduit 19.

After the U-shaped horn 26 arrives in the position shown in Fig. 1 compressed air is admitted to a chamber within the housing 31 to move the piston therein and the piston rod 32 (Fig. 2) downwardly. The lever 33 is pivoted about its fulcrum pin 34. The free end of the lever 33 engages the U-shaped horn 26 to move the magazine 21 and the horn upwardly. The U-shaped horn and the magazine 21 are lifted so that the wheels 24 are raised off the tracks 23 and the upper end of the magazine 21 is brought into contact with a sealing ring on a lower end of the air blow valve assembly 36. At the same time the free end 37 of the U-shaped horn and an adapter plate 38 carried thereby are urged against the lower end of the box 14.

The box 14 is prevented from moving upwardly by means of a movable abutment member 41. This member is moved downwardly at the same time that U-shaped horn 26 is moved upwardly so that the box 14 is clamped between the movable abutment member 41 and the adapter plate 38. The abutment member 41 is carried by a movable piston rod 42 which extends from a cylinder 43. Air or liquid is forced into the upper end of the cylinder 43 and causes the piston rod 42 and the abutment member 41 to move downwardly. Such movement is desirably carried out at the same time that the piston rod 32 is moved downwardly to thus rigidly clamp the box 14 between the abutment member 41 and the discharge end of the U-shaped horn. These parts are so arranged and moved to avoid a tendency of shifting the box 14 in vertical directions.

Figure 3:
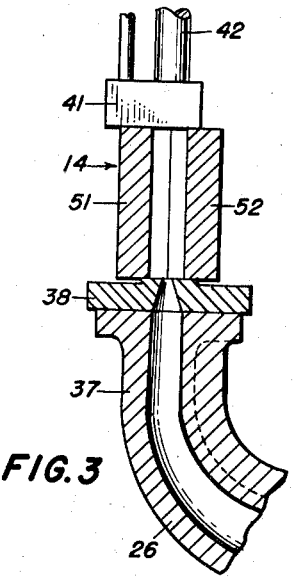
Fig. 3 is a sectional view taken through one type of core box and the discharge end of the sand magazine.

When the parts are in position shown in Fig. 2 air is introduced into the upper end of the magazine 21 from the blow valve 36 by suitable control means. The air under pressure moves downwardly in the magazine 21 forcing the sand and resin mixture around the lower end of the U-shaped horn 26 and up through the opening or openings in the adapter plate 38 (Fig. 3) and into the box 14. If desired the adapter 38 and the abutment member 41 may be cooled to prevent them from being unduly heated as a result of contact of these elements with the respective mold boxes.

The metal structure of the boxes 14 having been heated by one or more previous passages through the oven 10 retains a temperature in the vicinity of five hundred degrees Fahrenheit. The sand and the thermosetting resin mixture fills a box 14 and the resin component of the mixture binds the sand around the perimeter of the cavity or cavities of the box in a relatively short interval. It is for this purpose that the air supplied from the valve structure 36 is permitted to remain applied to the granular material filling the box 14. A thin shell is formed along the entire perimeter of the box and air supplied into the upper end of the magazine 21 is then relieved. The magazine 21 and the horn 26 are then lowered by gravity action which takes place when the air is permitted to escape from the chamber in the housing 31. The abutment member 41 is also moved upwardly by applying liquid or air under pressure to the under side of the piston within the cylinder 43.

Figure 4:
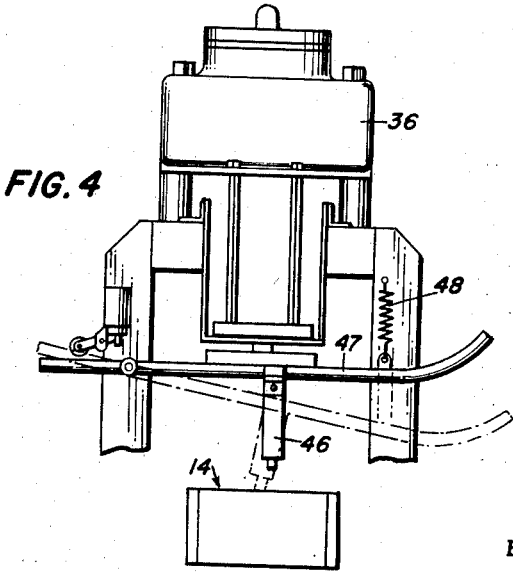
Fig. 4 is an elevational view showing the characteristics of the vibrating mechanism.

The sand and resin mixture which has not hardened within the box 14 is then free to fall out of the box through the filling hole or holes and escape from the box. As a result of the thermo-setting characteristics of the mix a thin shell of resin bonded sand remains conforming to the interior shape of the box. A vibrating device of a well-known type such as shown at 46 (Figs. 1 and 4) may be lowered by means of a hand operated lever 47 so as to engage an upper surface of the box 14. The induced vibration of the box causes any excess or free sand and resin to escape therefrom. A spring or the like 48 retracts the lever 47 and returns the vibrating device 46 to an inoperative position.

The table 12 is then indexed so as to move the box with the partially cured shell or shells therein into the oven 10 in an indexing operation. The box 14 moves through the oven 10 in a series of steps and remains therein for a sufficient period during normal operation of the machine to cure the resin binding the sand and forming a hollow core or cores or the like.

The table 12 is moved in a series of rotative steps in the direction of the arrow 49 causing one of the boxes 14 to arrive at the discharge station. A mechanism for opening each box and permitting the removal of the core or cores therefrom and the cleaning of the boxes in preparation for refilling is shown in Figs. 5 and 6. One part 51 of each box remains fixed to the table 12. The other part 52 is removable from the fixed part so that the finished mold element or elements may be removed from the box. The outer part 52 of the box is provided with vertically extending grooves 53 at the opposite sides thereof which are adapted to receive the free ends 54 of two arms 56. These arms normally swing toward each other when the piston rod 57 is moved upwardly from the position shown in Fig. 5 to the position shown in Fig. 6. A cylinder 59 having a piston 58 therein is provided for actuating the piston rod 57. Such a mechanism is provided in association with each core box for holding the outer part 52 in operative relationship with the inner part 51 and all of such equipment is mounted within the table 12.

A device is provided at the discharge station supported by the oven structure for engaging and removing the outer part 52 of each box 14. This device includes an arm 61 swingable about a vertical pivot 62 carried by the oven structure. A cylinder 63 is mounted at the free end of the arm 61. The arm 61 is swingable in an arcuate path between an adjustable abutment 64 and an adjustable abutment screw 66. Two pistons 67 and 68 are mounted for axial movements within the cylinder 63. A piston rod 65 connected to piston 67 extends through the piston 68 and a hollow piston rod 75 and projects beyond the cylinder 63 and is operatively connected to adjacent ends of a pair of claws 69 which are swingable about vertical pivots 78 carried by the claw support 79. The tubular piston rod 75 is connected to the annular piston 68 and extends beyond the cylinder 63 and is operatively connected to the claw support 79. When compressed air is supplied to the chamber 71 and the chamber 72 both within the cylinder 63 the piston 67 and the piston rod 65 move in the direction of the arrow 81 to swing the gripping jaws 69 in an open position as shown in Fig. 6. The ends 54 of the arms 56 bear against the core box part 52 in the grooves 53 and hold the outer part of the box in operative association with the fixed part 51. Under such conditions the gripping jaws 69 and the arm 61 are swung to an outer position with the arm 61 in engagement with the abutment 64.

Figure 7:
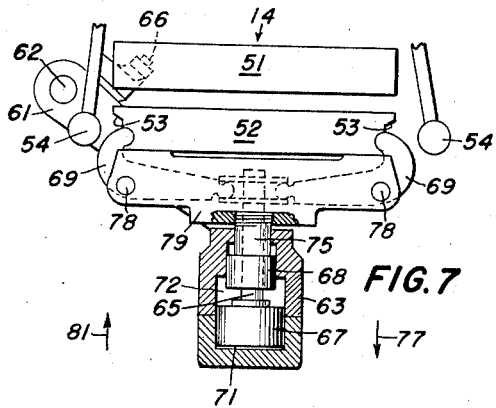

When one of the boxes 14 is indexed to the discharge station the gripping claws 69 and the cylinder 63 therefor are swung to the position shown in Fig. 5. The engagement of the lever arm 61 with the abutment 66 positions the claws adjacent the grooves 53. Air is then admitted to the cylinder 59 so as to move the piston rod 57 downwardly. The lugs 76 on the arms 56 engage portions of the table structure 12 so that the ends 54 then move outwardly and assume the positions shown in Fig. 5. At the same time air is exhausted from the chamber 71, this causes the piston 67 to move in the direction of the arrow 77. Air pressure is maintained in chamber 72 and the piston 68 retains its position at the end of cylinder 63. Such movement of piston 67 causes the jaws 69 to grip the core box part 52 in channels adjacent the grooves 53. After core box part 52 is gripped by jaws 69 the relative motion of piston rod 65 and the tubular piston rod 75 ceases. The piston 67 has a greater effective area than piston 68 in chamber 72 so that the piston 67 continues to move in the direction of arrow 77 moving the piston 68 and the piston rod 75 and the jaw support 79 and the jaws 69 and the box part 52 to the position as shown in Fig. 7. This allows the box part 52 to move outwardly to clear the core. The box portion 52 and the gripping jaw operated mechanism may then be swung with the lever 61 to a position away from the table 12 whereby the core or cores may be removed.

The box portions are then blown clean and sprayed with a parting agent if desired. In order to reapply the box part 52 the arm 61 is moved in a counter-clockwise direction against the abutment 66. Air is then introduced into the chamber 71 and the piston 67 moves in the direction of the arrow 81 causing the gripping jaws 69 and the core box portion 52 to move in the same direction against the core box part 51. The piston 67 continues its movement in the direction of the arrow 81 because its effective area in the chamber 72 is less than in the chamber 71 because of the existence of the piston rod 65. Such additional movement of the piston 67 causes the jaws 69 to be released from the channels. At the same time the clamps as represented by the ends 54 of the arms 56 are moved into the grooves 53 and such steps are accomplished by admitting air to the cylinder 59 which move the piston rod 57 upwardly to hold the core box part 52 against the core box part 51. The gripping claws and the operating mechanism thereafter may be swung to the inoperative position by turning the arm 61 in a clockwise direction against the abutment 64. The empty box is then moved to a filling station when it again receives the sand and resin mixture. During such operation another box is removed from the oven 10 by reason of the rotative steps of the table 12.

The design of the cavity or cavities in the box 14 and the overall shape and configuration of the boxes may be varied to adapt the apparatus to various types of molding operations. Any type of split box may be employed provided that the filled openings are arranged in the lower end of the box for receiving sand and the resin mixture from U-shaped horn 26.

Other types of ovens may be provided and other changes may be made in the apparatus. Such modifications and others may be made without departing from the spirit and scope of the invention as set forth in the appended claims.

What I claim and desire to secure by Letters Patent is:

1. Molding apparatus comprising in combination, a magazine including a U-shaped conduit portion having an upwardly disposed opening at a free end thereof, a hopper for storing a mixture of sand and heat hardening resin and having a discharge outlet, means supporting said magazine for movement to a position under said discharge outlet where the magazine receives said mixture from the hopper, a heated mold container having a downwardly disposed opening in a lower portion thereof, means for moving the magazine to position the free end thereof under said mold container, means for moving the free end of the magazine upwardly into engagement with the lower portion of said container and to bring said openings into registration, abutment means movable into engagement with an upper portion of the container, means for supplying compressed air into the magazine to move the mixture into the container, and means for withdrawing the magazine from said container so that unbonded sand and resin may escape by gravity through said downwardly disposed opening in the mold container.

2. Molding apparatus comprising in combination, a magazine including U-shaped conduit means having an upwardly disposed opening at a free end thereof, a hopper for storing a mixture of sand and heat hardenable resin, said hopper having a discharge outlet, a carriage supporting said magazine for rolling movement to a position under said discharge outlet whereby the magazine receives a quantity of said mixture from the hopper, a heated mold container having a downwardly disposed opening in a lower portion thereof, means for moving the magazine horizontally to position the free end thereof under said mold container, means for moving the magazine including the free end upwardly to engage said lower portion of said container, abutment means movable into engagement with an upper portion of the container, means for supplying compressed air into the magazine to move the mixture into the container, means for lowering the magazine and withdrawing it to a position under the hopper whereby loose portions of the mixture may drain through said downwardly disposed opening, and means for vibrating the container to exhaust insecurely bonded portions of the mixture therefrom by gravity action through said downwardly disposed opening.

3. Apparatus for molding hollow cores comprising in combination, a split core box having a cavity therein, said box having an opening in a lower portion thereof communicating with the cavity, means supporting the core box in a fixed position, means for preheating the core box, a U-shaped magazine adapted to contain a mixture of sand and a thermo-setting resin, said magazine having an upwardly disposed opening in an end of one leg, means for moving the magazine to position the opening in the leg thereof around the opening in the box, means for supplying compressed air into the other leg of the magazine to move the mixture into the box, means for retracting the magazine away from the box after the resin at the perimeter of said cavity is partially cured, and means for vibrating the core box to discharge unbonded portions of the mixture therefrom through the opening in the lower portion thereof.

4. Apparatus for molding shell type cores comprising in combination, a core box having a mold cavity therein with a downwardly disposed opening therein communicating with the cavity, means for heating said core box, a hopper for storing a mixture of sand and heat setting resin, a U-shaped magazine movable to a position for receiving a quantity of said mixture from the hopper, said magazine having an upwardly disposed discharge outlet, means for moving the magazine to position the discharge outlet in registration with the opening in the core box, abutment means for engaging an opposite portion of the core box, means for supplying compressed air into the magazine to move the mixture into the core box, means for retracting the magazine from the core box whereby unbonded sand and resin escapes by gravity action through said opening, means movable into engagement with the core box for vibrating the core box to discharge insecurely bonded portions of the mixture therefrom through said opening, and means for further heating the core box, and the sand and the resin retained there.

5. Apparatus for molding sand and a heat hardenable resin comprising in combination, a mold box formed of two mating parts, said box having a mold cavity therein and a downwardly directed opening, means for heating said box, a U-shaped magazine for containing a supply of a mixture of sand and a heat hardenable resin curable at the temperature of the heated box and having discharge outlet therein, an upwardly disposed means for forcing the mixture upwardly through said outlet into the cavity through said opening, means for discharging unbonded portions of the mixture from said box downwardly through said opening, means for moving the box with the retained mixture therein into the presence of said heating means to complete the cure of the resin component of the mixture, and means for removing one part of the box from the other part to permit removal of the molded article.

6. Apparatus for molding sand and a heat hardenable resin into a shell type of structure comprising in combination, a table supported for rotation in a fixed horizontal plane, a mold box formed of two mating parts with one part rigidly secured to a peripheral portion of said table, said box having a mold cavity therein in communication with a downward directed opening, a heated oven through which the periphery of said table and the box move for heating the mold box, a magazine including a U-shaped conduit portion having an upwardly disposed opening at a free end thereof, said magazine being adapted to receive a mixture of sand and a heat hardenable resin curable at the temperature of said mold box after it has been heated by said oven, means for moving said magazine to a position with the upwardly disposed opening in registration with the downwardly directed opening in the mold box, abutment means movable into engagement with an upper portion of both parts of the mold box to resist upward movement thereof in response to upward movement of the magazine, means for supplying compressed air into the magazine to force the mixture therein upwardly through said openings to fill the mold cavity whereby the residual heat of said box preliminarily cures the resin in to bond the sand as a shell at the perimeter of the mold cavity, means for retracting the magazine from operative association with the mold box whereby unbonded free portions of the mixture escapes by gravity action through said downwardly directed opening, means for retracting said abutment means, and said table being rotatable to move the mold box with the partially cured sand and resin shell therein into and through said oven and to an unloading station.

7. Apparatus for molding sand and a heat hardenable resin into a shell type of structure comprising in combination, a carrier supported for rotation in a horizontal plane, a mold box formed of first and second mating parts with the first part rigidly secured to said carrier, said box having a mold cavity therein communicating with a downward directed opening, a heated oven through which the box moves during rotation of the carrier, means adapted to contain a mixture of sand and a heat hardenable resin curable at the temperature of said mold box after it has been heated by said oven, means for moving the first means into operative association with said box and said downwardly directed opening, means for forcing said mixture upwardly through said opening to fill the mold cavity whereby the heat retained by the box parts cures the resin, means for retracting said second means from said box for discharging unbonded portions of the mixture downwardly through said opening before the resin at the interior of the cavity is cured, and means for moving the second part of the box from the first part.

8. Apparatus for molding sand and a heat hardenable resin into a shell type of core comprising in combination, a carrier supported for rotation in a fixed horizontal plane, a core box formed of two mating parts with one part rigidly secured to said carrier, said core box having a mold cavity therein in communication with a downwardly disposed opening, a heated oven through which said core box moves upon rotation of the carrier, a magazine adapted to contain a mixture of sand and a heat hardenable resin curable at the temperature of said core box after it has moved through said heated oven, said magazine having an upwardly directed discharge outlet, means for moving said magazine to position the upwardly directed discharge outlet under said downwardly disposed opening in the core box, means including a pivoted lever for moving said magazine upwardly to position the discharge outlet adjacent said opening, means for forcing the mixture upwardly through said discharge outlet and upwardly through said opening to fill the mold cavity whereby the heated box hardens the resin at the perimeter of the mold cavity to bind the intermingled sand as a shell throughout the perimetral area of the mold cavity, means for retracting the magazine to a position freeing said downwardly disposed opening for the escape of unbonded portions of the mixture by gravity action through said opening.

References Cited in the file of this patent

UNITED STATES PATENTS

| | | |
|---|---|---|
| 808,367 | Hewlett et al. | Dec. 26, 1905 |
| 2,524,447 | Judell | Oct. 3, 1950 |
| 2,607,967 | Springer | Aug. 26, 1952 |
| 2,695,431 | Davis | Nov. 30, 1954 |
| 2,724,878 | Valyi | Nov. 29, 1955 |
| 2,769,216 | Dick et al. | Nov. 6, 1956 |

FOREIGN PATENTS

| | | |
|---|---|---|
| 1,509,189 | France | Nov. 10, 1953 |